United States Patent [19]

Wright, Jr.

[11] Patent Number: 4,809,897

[45] Date of Patent: Mar. 7, 1989

[54] MULTICOMPARTMENT CONSOLE STORAGE RECEPTACLE

[75] Inventor: William J. Wright, Jr., West Bloomfield, Mich.

[73] Assignee: Center-Tech Incorporated, Walled Lake, Mich.

[21] Appl. No.: 174,219

[22] Filed: Mar. 28, 1988

[51] Int. Cl.$^4$ ................................................ B60R 7/00
[52] U.S. Cl. ...................................... 224/282; 220/23; 224/42.42
[58] Field of Search ...................... 224/42.42, 273, 275, 224/282; 220/20, 22, 23

[56] References Cited

U.S. PATENT DOCUMENTS

| | | | |
|---|---|---|---|
| 2,692,638 | 10/1954 | Castell | 224/275 |
| 3,338,629 | 8/1967 | Drees | 224/275 |
| 3,482,418 | 12/1969 | Moore | 220/23 |
| 4,106,829 | 8/1978 | Dolle | 224/275 |

Primary Examiner—Robert W. Jenkins

Attorney, Agent, or Firm—John R. Benefiel

[57] ABSTRACT

A multicompartment storage receptacle is disclosed configured to be mounted between the front seats of an automobile, having a lower compartment member providing large volume compartment, with an upper compartment member functioning as a lid hinged on one side to the lower compartment member. A locking cover for an upper storage compartment is hinged to the opposite side of the upper compartment member from the hinge to the lower compartment member to create an accordion-like unfolding allowing independent access to each compartment. The underside of the cover projects forwardly to be usable as a writing surface, while the top is recessed to form a tray storage space. Circular openings are formed in the upper compartment member at a location aligned with a secondary cavity in the lower compartment member adapted to receive beverage cans and the like disposed in the circular openings.

10 Claims, 2 Drawing Sheets

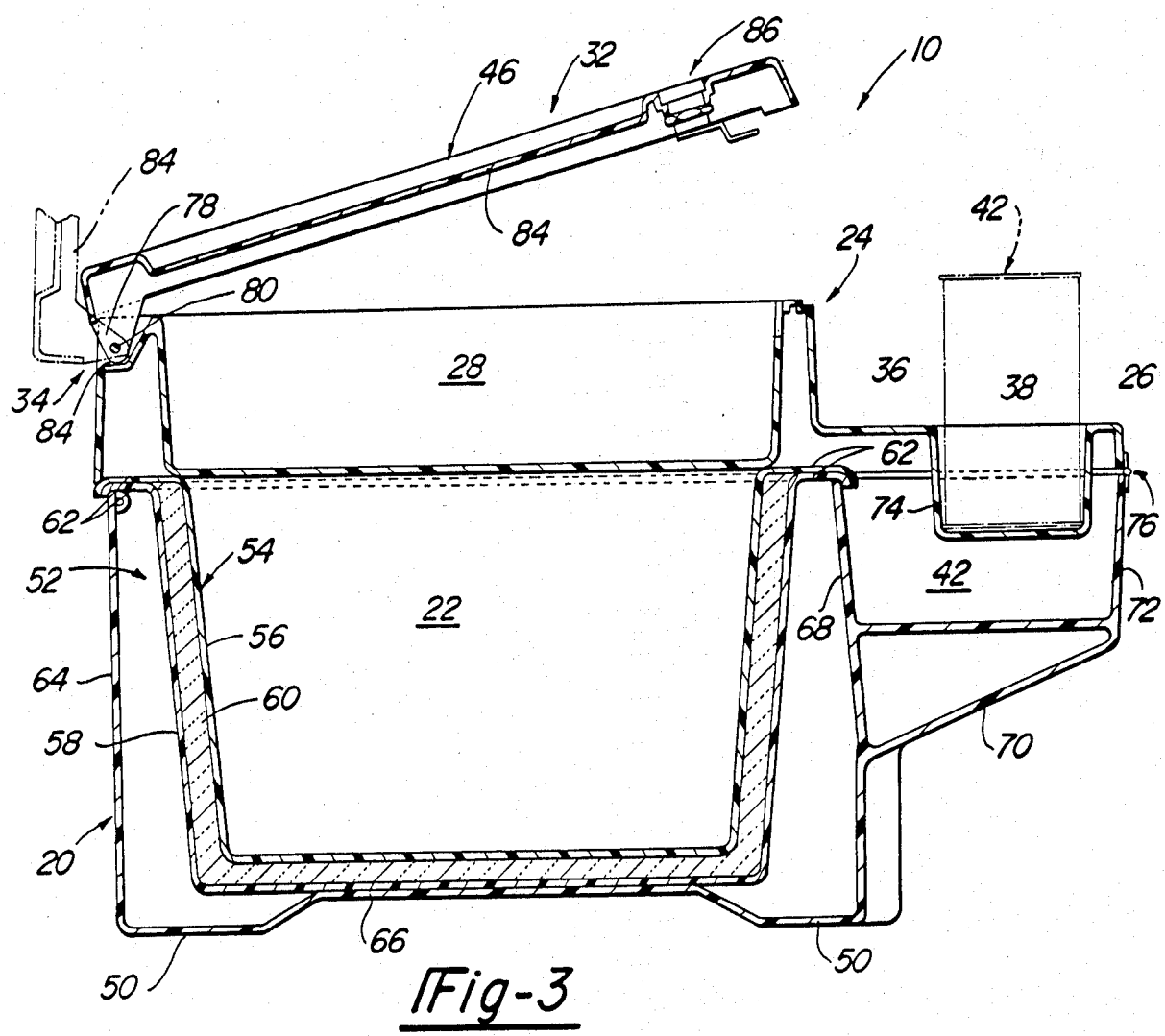
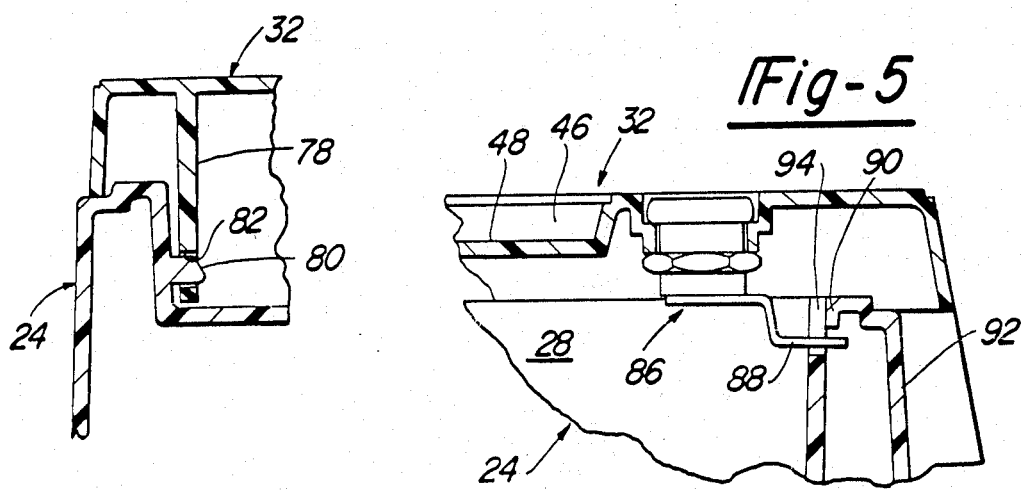

MULTICOMPARTMENT CONSOLE STORAGE RECEPTACLE

BACKGROUND DISCUSSION

This invention concerns storage receptacles and more particularly automotive console type storage receptacles secured between the driver and front passenger seats.

There is often provided a "console" between the driver and front passenger seats in autos, which includes a relatively small volume storage receptacle, suitable for such items as audio tapes, keys, change, etc. The elimination or reduction in size of the transmission hump resulting from the adoption of front wheel drive increases the theoretical space available for such consoles. Similarly, in vans and light trucks, the higher seat heights would enable higher volume storage receptacles, and the recent greatly increased purchases of such vehicles for personal use creates a desirability for utilization of such potential storage space for added convenience.

The organization of any increased storage space would be important to allow segregation of articles, i.e., small items such as audio tapes, change, etc., would not be suitably stored together with beverage containers, etc.

The possibility of using such space as a cooler using ice or refrigeration apparatus would of course render impractical storage of any other items in the same space. Further the height at which the small items should be stored should allow ready access thereto, and preferably also security locking for storage of such items.

Accordingly, it is an object of the present invention to provide a large volume console storage receptacle enabling segregated storage for items to be stored therein, and which allows secure and convenient access for relatively small items.

SUMMARY OF THE INVENTION

This and other objects which will become apparent upon reading of the following specification and claims are accomplished by stacked upper and lower compartment members, each defining an internal open topped cavity providing upper and lower storage compartments. In the preferred embodiment, the lower compartment member is elongated and rectangular in shape adapted to be fixed to the vehicle floor between the seats, while the upper compartment member is similarly shaped to fit over and cover the open topped cavity of the lower compartment member. The upper compartment member is connected along the rear side thereof by hinge means allowing the upper compartment to be able to be swung up and away from the lower compartment member, enabling access to the lower compartment.

A removable insulating liner insert may be employed in the relatively larger volume lower compartment, rendering it suitable for use as a cooler for beverages, etc.

A cover configured to overlie and cover the open-topped cavity of the upper compartment member is hinged along the front side to the front side of the upper compartment member allowing the cover to be swung forwardly in the opposite direction from hinging of the upper compartment member to uncover the upper compartment.

The opposite locations of the respective hinges produces an accordion-like relationship between the upper and lower compartment members and cover, allowing opening of the lower storage compartment without any tendency to result in inadvertent opening of the upper compartment member cover.

In the preferred embodiment, the cover carries a key lock to allow securing the cover in its closed position, and the top of the cover itself recessed to provide a tray storage space.

The underside of the cover defines a smooth planar writing surface and the cover hinge stops the cover in an inclined upright position to allow convenient use as a writing surface.

Only the forward portion of the length of the upper compartment member defines the upper storage compartment, the remaining rear portion being of substantially lower height and overlying a secondary open topped cavity formed at the rear of the lower compartment member. A pair of circular openings are formed in the rear portion of the upper compartment, extending downwardly into the secondary cavity, with wells for supporting beverage containers, inserted into the openings.

DESCRIPTION OF THE DRAWINGS

FIG. 3 is a transverse sectional view taken along 3—3 through the console storage receptacle of FIG. 1, with the cover partially swung up.

FIG. 4 is a fragmentary sectional view taken along the line 4—4 in FIG. 2.

FIG. 5 is an enlarged fragmentary view of a portion of the section shown in FIG. 3, but with the cover in the closed position.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
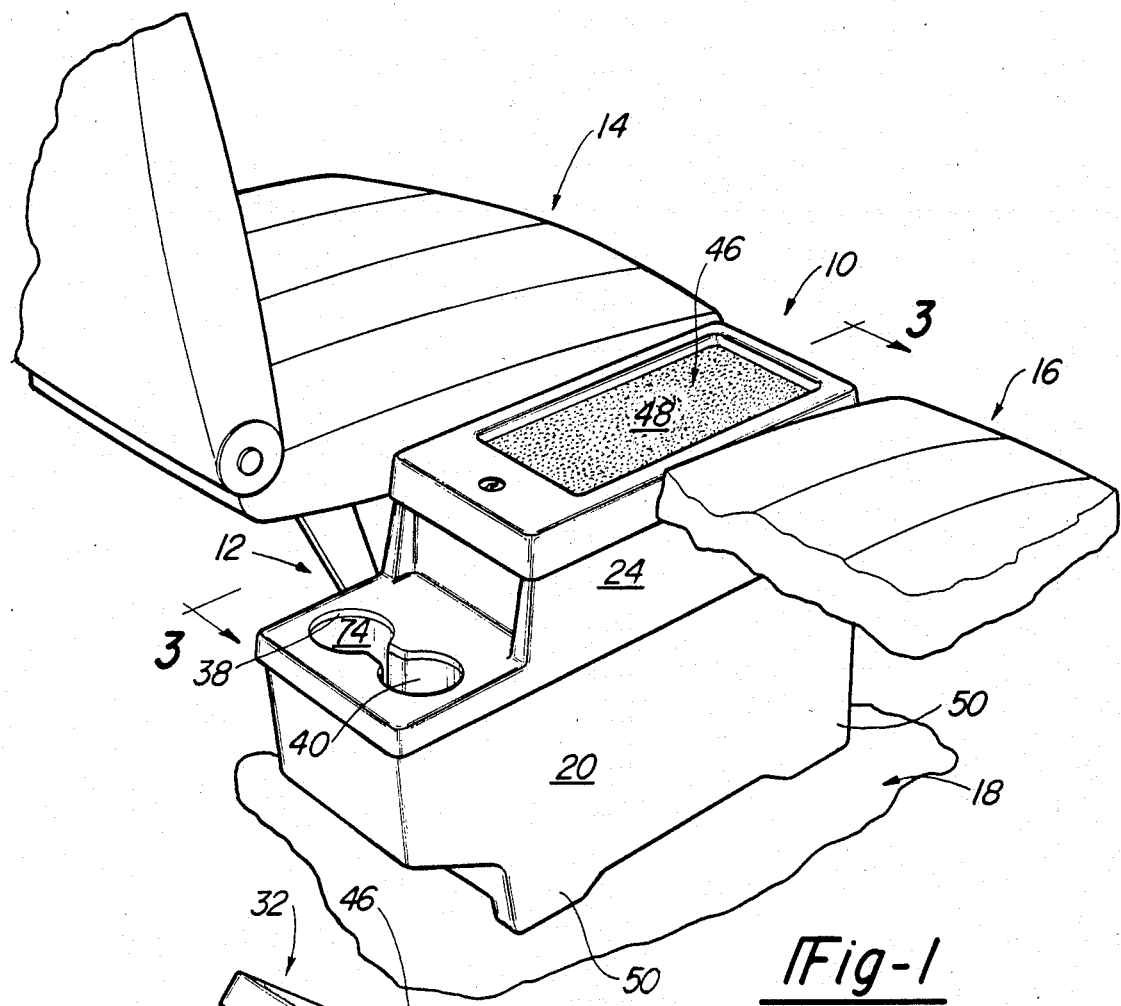
FIG. 1 is a fragmentary perspective view of the forward passenger compartment of an auto, with a console storage receptacle installed between the driver and front passenger seats.
Figure 2:
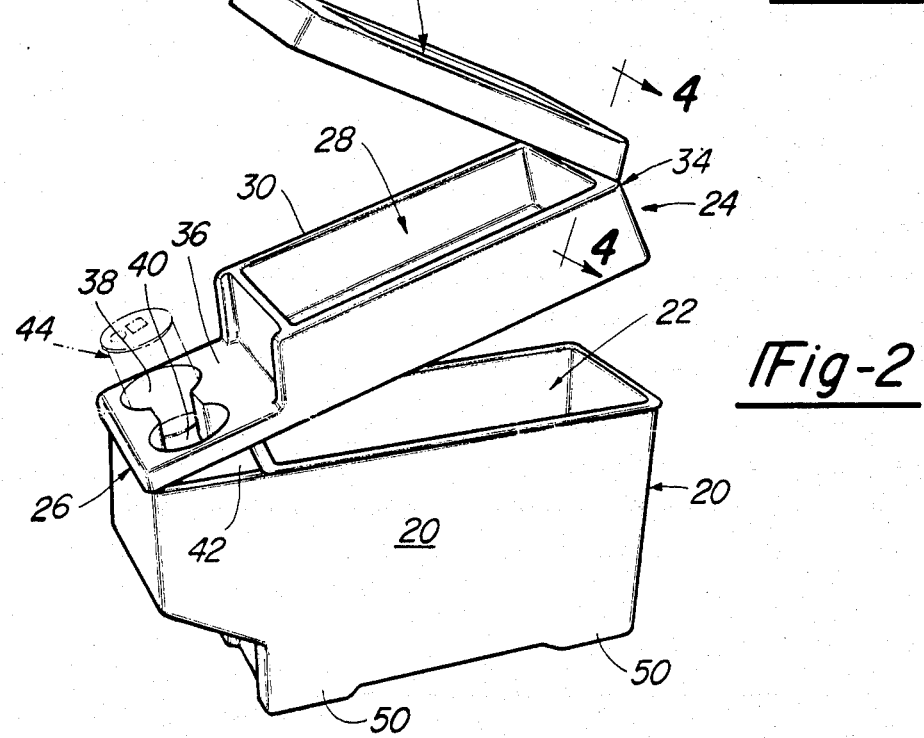
FIG. 2 is a perspective view of the console storage receptacle according to the present invention, with the cover and upper compartment partially swung open to illustrate the hinged relationship.

Referring to the drawings, and particularly FIGS. 1 and 2 the console storage receptacle 10 according to the present invention is shown installed in the space 12 between the driver's seat 14 and the passenger's seat 16. The console storage receptacle 10 as shown is generally elongated and rectangular in shape to fit the space 12 between the seats 14 and 16.

The console storage receptacle 10 includes a rectangular elongated lower compartment member 20 fixed to the vehicle floor 18 and which includes an open topped cavity providing a lower storage compartment 22. Also included is a rectangular upper compartment member 24 configured to overlie and cover the lower compartment member 22, and is hinged thereto along the rear side 26 to enable the upper compartment member 24 to be swung up and away to enable access to the lower storage compartment 22.

The upper compartment members 24 includes an upper storage compartment 28 defined by a forward portion 30 of the of the upper compartment member 24, raised to the height of the upper compartment member 24. A cover member 32, configured to cover and overlie upper storage compartment 28, is hinged at the forward end 34 to enable it to be swung up and away to enable access to the upper storage compartment 28.

The hinging of the cover 32 and upper compartment member 24 at opposite sides creates an accordion like folding effect as seen in FIG. 2, with opening movement in opposite directions as shown.

This enables the upper compartment 24 to be swung up to access the lower compartment 22 without creating a tendency to cause inadvertent opening of the cover 32, its weight tending to hold it closed by virtue of being hinged at the upper end.

The upper compartment 24 is formed with a rear located low height portion 36 adjacent the rear side 26. A pair of side-by-side substantially circular openings 38, 40 enter into the planar portion 36, extending into a secondary cavity in the lower compartment member 20, to accommodate beverage containers such as the can 44 shown in phantom in FIG. 2.

The upper part of the cover 32 is formed with a recess forming a storage tray 46 having a non-skid surface 48 to allow deposit of loose articles which are prevented from sliding and dislodgement by the nonskid surface 48.

FIGS. 3-5 reveal further constructional details of the console storage receptacle 10 according to the present invention.

Each of the lower compartment member 20, the upper compartment member 24, and cover. 32 are each formed of a suitable molded plastic such as ABS.

The lower compartment member 20 is formed with protuberances at each corner forming foot portions 50 enabling anchoring to a contoured vehicle floor surface with four mounting screws (not shown).

The lower compartment member 22 defines an open topped cavity 52 receiving an insulated insert 54 comprising the lower storage compartment 22. The insert 54 can be formed with inner and outer shells 56, 58, with an intermediate layer of insulating material 60 such as foam plastic. Flanges 62 allow nesting of the insert 54 into the cavity 52 as to rest on the upper edge of the vertical walls 64 of the lower compartment member 20 and atop a raised floor portion 66.

Secondary cavity 42 is defined by a partition and forwardly projecting webs with a bottom wall 70 and end wall 72. A holder well 74 is formed beneath openings 38 and 40 adapted to support a beverage container such as can 44.

A first hinge means 76 pivotally joins the upper compartment 24 to the lower compartment 20 at the rear side 26 of each, to enable swinging movement of the upper compartment member 24 to open the lower storage compartment 22.

Second hinge means are provided at the rear side 34 of the upper compartment member 24, comprised of clevis 78 integrally formed with the cover 32 and hinge pins 80 integrally molded in the upper compartment member (FIG. 4) fit into a hole 82 in a respective clevis 78.

The clevises 78 bear against a lip portion 84 in the fully open position of the cover 32 so that a smooth undersurface 84 is positioned conveniently as a writing surface along side the seats 14, 16.

In order to provide security for articles in the upper compartment 28, a key lock 86 is provided mounted to the free side of the cover 32. Key lock 86 is of conventional design and includes a striker tang 88 movable to a locking position swung beneath a lip 90 molded into the upper side of the outer wall through a slot 94 formed in the inner wall 96 of the upper compartment member 24.

Accordingly it can be appreciated that the console storage receptacle 10 described achieves the above recited object of the invention.

The "accordion" hinging action allows independent access to the upper and lower compartments 22, 28. Articles may be segregated in tray 46 and the upper and lower compartments 22, 28, in addition to wells 74 so that the increased space between the seats available in vans and trucks may be conveniently utilized by a motorist.

The console storage receptacle 10 according to the present invention may be variously shaped and may omit various inessential features shown in the preferred embodiment, the invention being defined by the following appended claims.

I claim:

1. A multicompartment storage receptacle comprising:
    a first compartment member defining an open-topped internal cavity providing a lower storage compartment;
    a second compartment member defining an open-topped cavity providing an upper storage compartment, said second compartment member positioned atop said first compartment member and configured so as to close said open-topped cavity thereof;
    an upper compartment cover normally overlying said upper compartment member and configured to close off said open-topped cavity thereof;
    first hinge means connecting adjacent portions of said upper and lower compartments on one side thereof to enable said upper compartment member to be swung up and away from said lower compartment member in a first direction;
    second hinge means connecting adjacent portions of said cover and said upper compartment member on a side of said upper and lower compartments opposite to said first hinge means to thereby enable said cover to be swung up and away from said upper compartment member in a second direction opposite from said first direction, whereby said upper and lower storage compartments can be independently accessed by swinging either said cover or said upper compartment member from a position atop said upper compartment or lower compartment respectively to uncover a respective open-topped cavity thereof.

2. The storage receptacle according to claim 1 wherein said cover includes a planar writing surface on the underside thereof exposed upon swing out of said cover from said upper compartment member on said second hinge means, said second hinge means including stop means supporting said cover with the writing surface exposed in a predetermined swing out position thereof.

3. The storage receptacle according to claim 1 further including a removable liner member insertable in said open-topped cavity of said lower compartment member the interior thereof defining said lower storage compartment.

4. The storage receptacle according to claim 3 wherein said liner member is insulated to define a cooler chamber therein.

5. The storage receptacle according to claim 3 wherein said upper and lower compartment members are generally elongated and rectangularly configured and wherein said upper compartment member is raised to a height along only a portion of the length thereof to define the height of said open topped cavity comprising said upper compartment, and is at a substantially lower height for the remaining length thereof; said open topped cavity comprising said lower storage compartment lying generally beneath said raised portion of said upper compartment member; a secondary open topped cavity defined by said lower compartment member lying beneath said substantially lower height portion of said upper compartment member and normally covered thereby; and at least one opening in said lower height portion of said upper compartment member adapted to receive a beverage container.

6. The storage receptacle according to claim 5 further including at least one holder well extending from said opening below said upper compartment member into said secondary cavity to enable support of a beverage container inserted in said at least one opening.

7. The storage receptacle according to claim 6 wherein said first hinge means is located on the side of said upper compartment member outboard of said substantially lower height portion thereof.

8. The storage receptacle according to claim 1 further including locking means for selectively locking said cover in the closed position covering said upper compartment.

9. The storage receptacle according to claim 1 wherein the top of said cover is formed with a recess defining a storage tray.

10. The storage receptacle according to claim 9 wherein said storage tray is provided with a non skid surface.

* * * * *